US007450085B2

(12) United States Patent
Thielemans et al.

(10) Patent No.: US 7,450,085 B2
(45) Date of Patent: Nov. 11, 2008

(54) INTELLIGENT LIGHTING MODULE AND METHOD OF OPERATION OF SUCH AN INTELLIGENT LIGHTING MODULE

(75) Inventors: Robbie Thielemans, Nazareth (BE); Patrick Willem, Oostende (BE); Gino Tanghe, Merkem (BE)

(73) Assignee: BARCO, naamloze vennootschap, Kortrijk (BE)

( * ) Notice: Subject to any disclaimer, the term of this patent is extended or adjusted under 35 U.S.C. 154(b) by 706 days.

(21) Appl. No.: 11/052,057

(22) Filed: Feb. 8, 2005

(65) Prior Publication Data
US 2006/0077193 A1  Apr. 13, 2006

Related U.S. Application Data

(60) Provisional application No. 60/616,200, filed on Oct. 7, 2004.

(51) Int. Cl.
*G09G 5/00* (2006.01)
*G09G 3/30* (2006.01)

(52) U.S. Cl. ............................ 345/1.1; 345/55; 345/76; 345/84

(58) Field of Classification Search ............... 345/1.1, 345/1.3, 55, 76, 82, 84; 315/291, 292, 293, 315/294, 312, 316, 318; 362/85, 227, 249
See application file for complete search history.

(56) References Cited

U.S. PATENT DOCUMENTS

| | | | | |
|---|---|---|---|---|
| 5,796,376 | A * | 8/1998 | Banks | 345/82 |
| 5,990,802 | A * | 11/1999 | Maskeny | 340/815.45 |
| 6,498,592 | B1 * | 12/2002 | Matthies | 345/1.1 |
| 6,498,593 | B1 * | 12/2002 | Fujimoto et al. | 345/60 |
| 7,123,211 | B2 * | 10/2006 | Nowatzyk | 345/1.1 |
| 2004/0233125 | A1 * | 11/2004 | Tanghe et al. | 345/1.3 |
| 2005/0052375 | A1 * | 3/2005 | Devos et al. | 345/82 |
| 2005/0134526 | A1 * | 6/2005 | Williem et al. | 345/1.3 |

* cited by examiner

*Primary Examiner*—My-Chau T Tran
(74) *Attorney, Agent, or Firm*—Bacon & Thomas, PLLC

(57) ABSTRACT

An intelligent lighting module for use in a lighting or display module system which is composed of an array of lighting modules, each of the lighting modules being provided with a display board with an array of individual pixel lighting elements and with a control board capable of controlling serial input data from a video source for displaying video as well as of controlling digital communication input data from a lighting console for creating digital lighting effects, wherein the display board includes a drive buffer and an array of pulse-width modulation (PWM) drivers which are connected to the lighting elements.

11 Claims, 5 Drawing Sheets

INTELLIGENT LIGHTING MODULE AND METHOD OF OPERATION OF SUCH AN INTELLIGENT LIGHTING MODULE

This application claims the benefit of provisional application Ser. No. 60/616,200 filed Oct. 7, 2004 under 35 U.S.C. 119(e).

BACKGROUND OF THE INVENTION

1. Field of the Invention

The present invention relates to an electronic apparatus, in particular an intelligent lighting module, capable of enabling a generic building block light source that possesses uniform hardware and power requirements and is capable of being formed into a seamless display. In particular, the present invention relates to an electronic apparatus for a self-regulating, high-intensity electronic apparatus for a lighting module that can be packaged for different applications or markets and is capable of displaying standard video or providing standard digital lighting technology in a single module.

2. Discussion of the Related Art

High-intensity light sources, such as incandescent, fluorescent, and halogen lamps, have been long used in many large-scale applications, such as large public information displays, outdoor stadium displays and theatrical lighting systems. Originally, large, manually-operated switches and dimmers were located near the lamps to control the illumination of many large-scale lighting applications. Later, lamps were remotely operated by use of electronic dimmers that employ a low voltage direct current (DC) to control the lamps' high voltage power. Most recently, however, digitally controlled illumination systems have been developed in which a network of individual lights is controlled by a central computer controlled console. Such illumination systems are widely used today in, for example, theatrical lighting systems. In 1986, the U.S. Institute of Theatre Technology (USITT) developed the DMX512-protocol as a standard digital interface between dimmers and computer control consoles. In the DMX512 protocol, each lamp has a digital address and responds to the digital commands sent on a control cable to this address. A lamp may possess multiple addresses. For example, a color changing light may have one address to set the mode of the lamp (on/off/sound activated), another address to select the color, and a third address to set the speed at which the lamp changes the color. The DMX512 protocol is capable of controlling up to 512 addresses per each lighting group that is referred to as a "universe." The DMX512 protocol has allowed uniformity in programming digital lighting; however, a custom hardware setup that uses a variety of lamps is often created each time a lighting system is needed. Often, lamps have different power requirements: in some cases, they require external regulation; in other cases, they require high voltage, unregulated power supplies. Thus, what is needed, is an electronic apparatus capable of enabling a generic building block light source that possesses uniform hardware and power requirements and is compatible with industry standard lighting control protocols. Therefore, what is further needed is an electronic apparatus capable of enabling a self-regulating, high-intensity lighting module that can be packaged for different applications or markets, for example, for architectural lighting, for retail advertising, or for traditional theatrical lighting.

In a separate development area, projection systems have long been used to display large-scale moving pictures. The first commercial applications of large-scale video displays were limited to large arrays of television monitors. Relatively recent advances in the manufacture of light emitting diodes (LEDs) have made them an attractive light source for large-scale video displays. Large-scale video displays are now being used for sports stadiums, race tracks, arenas, coliseums and concert halls. Therefore, the market is demanding lighter, cheaper and larger displays that are easy to install, maintain and disassemble, especially for use in temporary venues; these are market specifications that are not possible to achieve in the older technologies. Additionally, in many large-scale applications, for example, in large concert halls or stadium music events, both video and lighting effects are desired. However, different display elements are generally needed for large-scale video versus large-scale lighting, in order to create the desired effects. Therefore, a large-scale system that is capable of generating both video and digitally controlled lighting is needed.

An example of a system that combines video and digitally controlled lighting system is found in reference to international patent application No. WO 99/31560, entitled, "Digitally controlled illumination methods and systems." The '560 application details processor-controlled LED lighting system, including kinetic illumination, precision illumination, a "smart" light bulb, an entertainment lighting system, a power/data protocol, a data delivery track, lighting components and sensor/feedback applications. In one embodiment of the invention, the lighting control signal can be embedded in any conventional electronic transmission signal, for example music, compact disc, television, videotape, video game, computer network, broadcast, cable, broadband or other communications signal. Therefore, for example, the lighting control signal may be embedded into an entertainment signal, for example, a television signal, so that, when the television signal is processed, a portion of the bandwidth of the television signal can control lighting. For example, in this embodiment, the color and intensity of room lights, as well as other lighting effects, may be directly controlled through a television signal. Thus, a television signal may instruct the room lights to dim at certain points during the presentation, to strobe to different colors at other points and to flash at other points.

However, the invention requires a decoder in order to split the incoming combined signal into a separate entertainment signal and lighting control signals. Subsequently, a lighting block that is used only for illumination purposes and an entertainment device that can be used only to display video process these signals. Therefore, the present invention is limited, in that it requires the use of separate modules for video display or lighting. Thus, what is needed is an electronic apparatus capable of providing both standard video and standard digital lighting technology for a generic lighting module.

SUMMARY OF THE INVENTION

It is an object of this invention to provide an electronic apparatus capable of enabling a generic building block light source that possesses uniform hardware and power requirements, compatible with industry standard lighting control protocols.

It is another object of this invention to provide an electronic apparatus capable of enabling a self-regulating, high-intensity lighting module that can be packaged for different applications or markets for example, for architectural lighting, for retail advertising or for traditional theatrical lighting.

It is yet another object of this invention to provide an electronic apparatus capable of providing both standard video and standard digital lighting technology for a generic lighting module.

To this end the invention relates in the first place to an intelligent lighting module for use in a lighting or display module system which is composed of an array of lighting modules, each of said lighting modules being provided with a display board with an array of individual pixel lighting elements and with a control board capable of controlling serial input data from a video source for displaying video as well as of controlling digital communication input data from a lighting console for creating digital lighting effects, wherein the display board comprises a drive buffer and an array of pulse-width modulation (PWM) drivers which are connected to the lighting elements and wherein the control board comprises:

- a serial data input;
- a communication data input;
- a memory, preferably a read-only memory, containing data such as hardware configuration data, executable code, and an installation controller containing installation parameters of the intelligent lighting module such as the position and orientation of the module in the lighting or display system and the module viewing angle;
- a memory, preferably a random access memory, containing ambient environmental data and display data during run time;
- a field programmable gate array (FPGA).

Such an intelligent lighting module according to the invention allows building a large-scale lighting or display system that is capable of generating both video and digitally controlled lighting.

Following a preferred embodiment the programmable gate array (FPGA) contains:

- a converter to "de-serialize" the incoming serial data in order to produce parallel pixel data in the form of lighting data and lighting addresses;
- a write look-up table and a read look-up table which provide cross-reference indexes that map the lighting data to the correct lighting element of the display board;
- a display buffer;
- a central processing unit (CPU) to write the lighting to memory in the order of sequential pixel addresses by using the write look-up table and thereby translating the original lighting address order to the sequential pixel address order and, in order to illuminate the lighting elements, to read the lighting data from the random access memory by using an address modified by the read look-up table and thereby converting the stored lighting data from sequential pixel address order to display drive order, and latching said lighting data via the display buffer onto the drive buffer of the display board to activate the pulse-width modulation drivers of the display board to produce an image at the display rate.

Preferably the intelligent lighting module is provided with a power regulation so that the lighting module with the above mentioned features constitutes a generic building block light source that possesses uniform hardware and power requirements and is capable of being formed into seamless display.

In the second place the invention relates to a method of operation of an intelligent lighting module, including the steps of

- initializing the field programmable array, whereby at power-up configuration data are fetched from a configuration data sector in memory, and the field programmable array then automatically instantiates its converter, control logic, split-PWM logic, central processing unit and sensor logic, after which the central processing unit boots from the boot-block sector in memory containing the executable code and commences operation;
- receiving the look-up tables, wherein the intelligent light module receives the display configuration data or reads these data from memory that will form the contents of the write look-up table and read look-up table that are stored in the control board;
- receiving serial and communication data, wherein the intelligent lighting module receives pixel image data and some control data on serial data input and display control data on communication data input and the central processor unit modifies the pixel image data according to the installation controller in memory and storing the modified pixel image data in memory, using the display drive order from the write look-up table;
- deciding whether or not to end the display, whereby the central processing unit determines whether a command has been received via the communication data input 114 to cease display and if yes ending the display, or if no, illuminating the lighting elements, whereby the central processor unit reads the lighting data from memory by using an address modified by the read look-up table and writes the lighting data to split-PWM logic that alters the data and provides Y-bit lighting data to the display buffer 128, and whereby this data is latched onto drive buffer 132 which activates the pulse-width modulation drivers 134, thereby illuminating each pixel of lighting elements 136 and subsequently returning to the step of receiving serial and communication data.

BRIEF DESCRIPTION OF THE DRAWINGS

In order to better explain the characteristics of the invention, the following preferred embodiment of an intelligent lighting module and of an operation method of such an intelligent lighting module according to the invention are described as an example only without being limitative in any way, with reference to the accompanying drawings, in which.

DESCRIPTION OF THE PREFERED EMBODIMENT

The present invention relates to an electronic apparatus, in particular an intelligent lighting module, capable of enabling a generic building block light source that possesses uniform hardware and power requirements and is capable of being formed into seamless display. In particular, the present invention relates to a self-regulating, high-intensity electronic apparatus for a lighting module that can be packaged for different applications or markets and is capable of displaying standard video or providing standard digital lighting technology in a single module.

Figure 1:
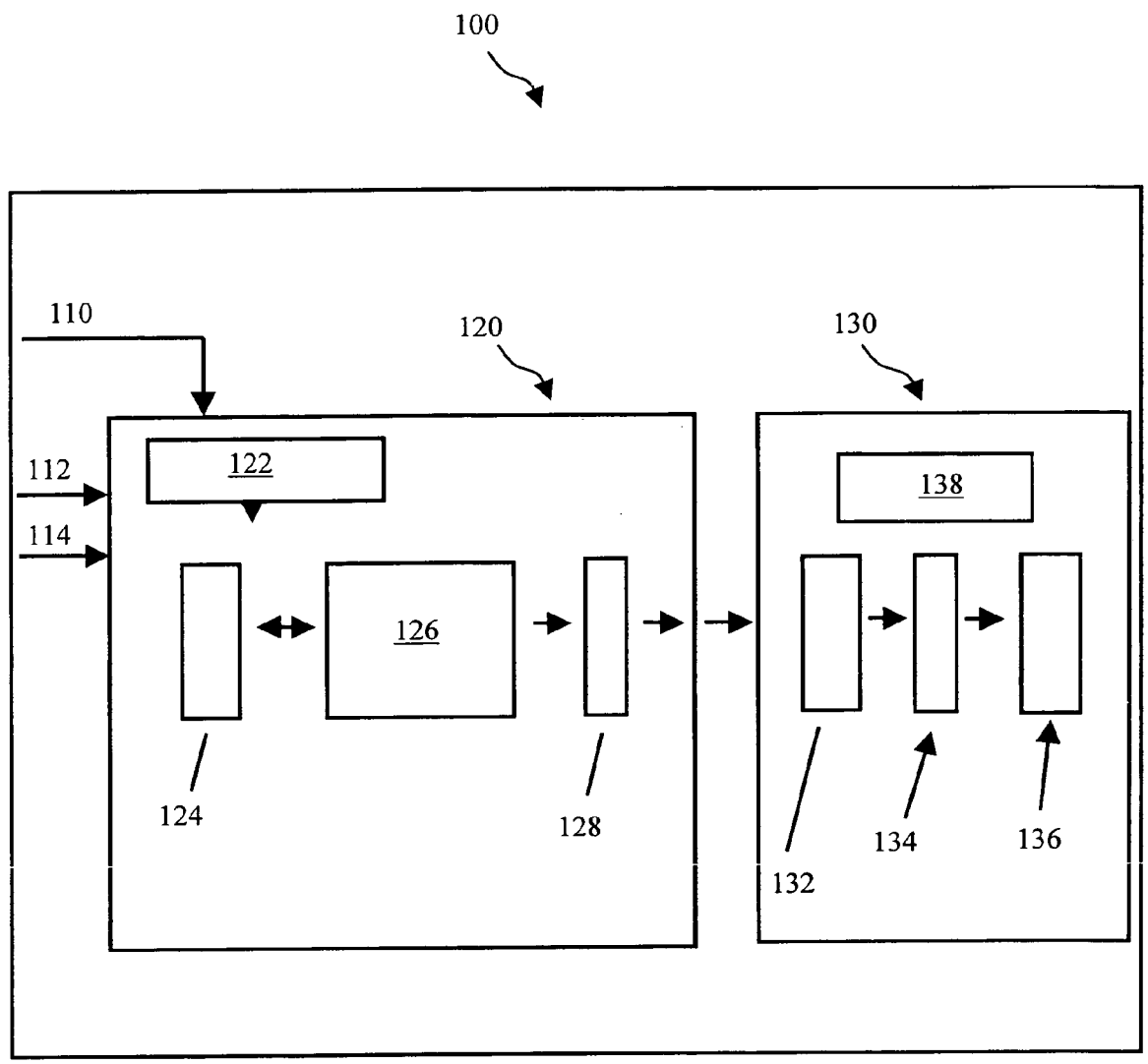
FIG. 1 illustrates a functional block diagram of an intelligent lighting module in accordance with the invention.

FIG. 1 illustrates a functional block diagram of an intelligent lighting module 100 in accordance with the invention. Intelligent lighting module 100 includes an input for power 110, an input for serial data 112, an input for communications data (comm data) 114, a control board 120 and a display board 130. Control board 120 further includes a power regulation 122, a memory 124, a field programmable gate array (FPGA) 126, and a display buffer 128. The display board 130 further includes a drive buffer 132, an array of pulse-width modulation (PWM) drivers 134, an array of lighting elements 136, and a sensor 138.

Power input 110 is a standard, unregulated or regulated power supply for intelligent lighting module 100, in the present example, +48V DC. However, other implementations of power 110 are possible and include AC, for example, 110V AC or 220V AC. Serial data 112 contains the display image data, for example, the pixel location address, and the value for the red, green, and blue (RGB) components of the pixel color; however, numerous other color definitions and standards are possible for serial data 112. Serial data 112 is updated according to the display refresh rate, as is well known to those skilled in the art. Serial data 112 can also contain some commands, e.g. some Barco commands as explained with regard to another provisional application in the name of the same applicant and entitled "System for and method of providing a common protocol for lighting and video devices". Comm data 114 is a digital serial input, for example, DMX512 protocol data, as is well known to those skilled in the art, that controls digital lighting effects, such as switching, dimming, and fading. Other communication protocols are possible, including custom lighting protocols. For further information regarding a custom lighting protocol, see another provisional application of the same applicant, entitled, "System for and method of providing a common protocol for lighting and video devices."

Control board 120 provides all the power regulation, processing capabilities, digital memory, and electronic buffering functions for intelligent lighting module 100. Regulation 122 provides all the power conversion and regulation functions required to produce internal source of power for all the electronic devices of intelligent lighting module 100. Memory 124 within control board 120 includes standard electronic components, such as "programmable read-only memory" (PROM) and "random access memory" (RAM). The content of Memory 124 contains such data as hardware configuration code, executable code, look-up tables, display data, ambient environmental data, and the installation controller. The installation controller contains data for the unique installation parameters of intelligent lighting module 100 that affect the operation of intelligent lighting module 100 such as the height of the module in the large-scale display, the module orientation, and the module viewing angle. FPGA 126 is a standard electronic component that provides all the digital processing capabilities necessary for the correct operation of intelligent lighting module 100. A suitable device for FPGA 126 is, for example, Cyclone 1C3, manufactured by Altera Corporation or XC3550, manufactured by Xilinx Inc. Display buffer 128 includes common electronic components, such as tri-state latches, tri-state line drivers, and electronic filtering components, such as capacitors (not shown).

Display board 130 provides the display lighting and the support functions necessary for its operation. Drive buffer 132 inputs parallel data from control board 120 and decodes and latches the lighting data. PULSE-WIDTH MODULATION drivers 134 include the standard display drivers necessary to illuminate lighting elements 136, and are, for example, constant current drivers that are commonly used for light emitting device (LED) displays or constant voltage drivers, used for liquid crystal displays (LCDs). Lighting elements 136 contain an array of individual pixel elements (not shown) that form the display, for example, an array of inorganic or organic light emitting diodes (LEDs or OLEDs) or an LCD. Sensor 138 monitors the ambient light conditions for display intensity processing by control board 120.

In operation, intelligent lighting module 100 receives pixel image data and control data on serial data 112, display control data on comm data 114, and display power on power 110. Power 110 and comm data 114 may originate, for example, from a controller (not shown). Further to this example, serial data 112 may originate from this controller or from another intelligent lighting module 100. FPGA 126 inputs serial data 112 and then "deserializes" it, in order to produce parallel pixel data. Serial data 112 may not be transmitted in the order of the sequential pixel addresses; therefore, FPGA 126 reorders the parallel pixel data and stores it in memory 124 in the order of sequential pixel addresses. Further, the order of sequential address locations in memory 124 may not be in an order that corresponds to the sequential pixel locations of lighting elements 136. Therefore, to display an image, FPGA 126 determines a display drive order from a look-up table that is uploaded by the microprocessor in the FPGA at start up. FPGA 126 then latches the parallel pixel data that correspond to contiguous pixel locations onto drive buffer 132. Pulse-width modulation drivers 134 then illuminate the corresponding pixels of lighting elements 136 to produce a single image at the display update rate.

Figure 2:
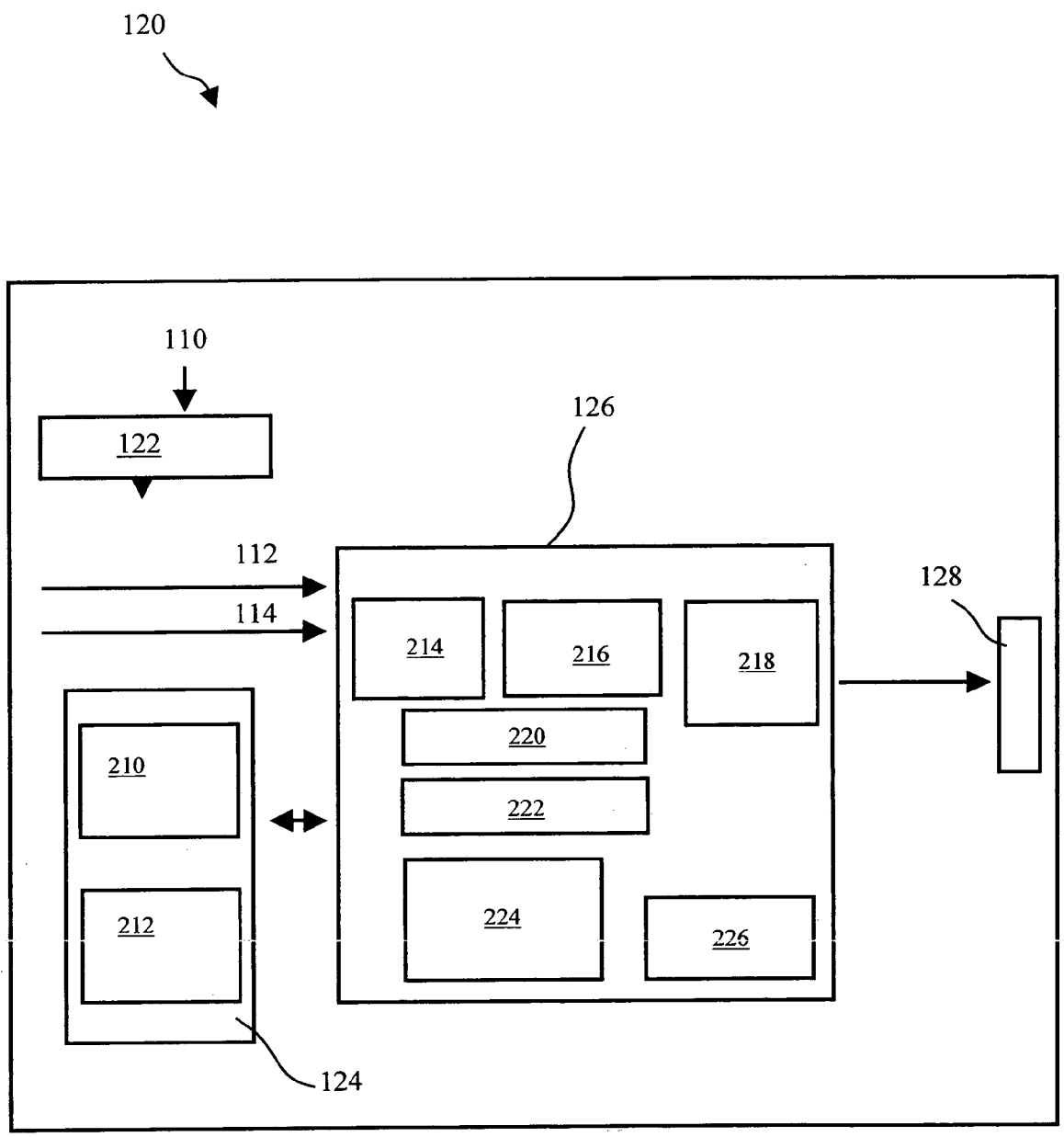
FIG. 2 illustrates a functional block diagram of a control board in accordance with the invention.

FIG. 2 is a functional block diagram that illustrates control board 120 in accordance with the invention. FIG. 1 is referenced throughout the description of control board 120.

Memory 124 within control board 120 further includes a programmable read-only memory (PROM) 210 and a random access memory (RAM) 212. FPGA 126 within control board 120 further includes a converter 214, a control logic 216, a split-PWM logic 218, a write look-up table 220, a read look-up table 222, a central processing unit (CPU) 224, and a sensor logic 226.

PROM 210 includes data, such as hardware configuration data, for control board 120, executable code for CPU 224 and the installation controller. The installation controller contains data for the unique installation parameters of intelligent lighting module 100 that affect the operation of intelligent lighting module 100 such as the height of the module in the large-scale display, the module orientation, and the module viewing angle. RAM 212 contains look-up tables, ambient environmental data, and display data during run time. Ambient environmental data, including ambient temperature, illumination, and humidity is available via communications data 114, from an external Ambient Environmental Controller (not shown). Converter 214 contains a serial to parallel converter for the incoming data of serial data 112. Control logic 216 contains the necessary control functions; for example, timing, enabling, glue logic, sequential and combinational logic, to coordinate the operation of FPGA 126. Split-PWM logic 218 enables the 16-bit lighting data to be written to a 12-bit pulse width modulation driver 134, without loosing the 16-bit resolution of the display. Write look-up table 220 and read look-up table 222 provide the cross-reference indexes that map the lighting data to the correct lighting element 136 of display board 130. CPU 224 is, for example a 32-bit microprocessor core, such as an 80C51, which is instantiated on FPGA 126 at power-up. Sensor logic 226 processes sensor data that originate on display board 130.

In operation, converter 214 "de-serializes" the incoming data of serial data 112 and provides parallel 16-bit lighting data and 7-bit lighting addresses to CPU 224. CPU 224 modifies the pixel image data according to the installation controller in PROM 210 and ambient data in RAM 212. CPU 224 then writes the lighting data to RAM 212 in the order of sequential pixel addresses by using write look-up table 220 and thereby translates the original lighting address order to the sequential pixel address order. To illuminate lighting elements 136, CPU 224 reads the lighting data from RAM 212 by using an address modified by read look-up table 222 and thereby converts the stored lighting data from sequential pixel address order to display drive order. CPU 224 then writes the lighting data to split-PWM logic 218. Split-PWM logic 218 enables the 16-bit lighting data to be written to, for example, a 12-bit pulse-width modulation driver 134, by writing the 12 most significant bits (MSBS) of the lighting data at a display write cycle rate that is equivalent to 16 times the display update rate. A single bit is added to each of these 16 display write cycles, for a number of times that is equal to the value of 4 least significant bits (LSBs) of the lighting data. Therefore, for example, if the 4 LSBs of the lighting data indicate a digital value of eight, then 8 of the 16 write cycles will be increased by a single bit. Display buffers 128 receive each of the resultant 12-bit lighting data, after which the 12-bit lighting data is latched onto drive buffer 132. Pulse-width modulation drivers 134 receive the latched data from drive buffer 132 and activate, for example, internal constant current drivers (CCDs) (not shown) within pulse-width modulation drivers 134. Other embodiments may utilize constant voltage drivers within pulse-width modulation drivers 134, i.e., to activate liquid crystal displays. In the present embodiment, the CCDs are activated for a period of time of the total display write cycle that is proportional to the numerical value of the 12-bit lighting data. Therefore, for example, if the 12-bit lighting data indicates a digital value of 2,048 of the 12-bit full scale value of 4,096, the CCD will be activated for one-half of the write cycle, and the corresponding color pixel will be illuminated at one half of its full scale intensity. Each CCD of pulse-width modulation drivers 134 thereby illuminates a single color component, for example red, green or blue, of each pixel of lighting elements 136. Separately, sensor logic 226 receives signals from a remote sensor on display board 130, for processing by CPU 224.

It is clear that the lighting data do not necessarily have to be 16-bit data but can in more general terms be data with an X-bit configuration, whereas the pulse-width modulation do not necessarily have to be 12-bit drivers but can be drivers with a Y-bit structure wherein Y is a smaller number than X. A person skilled in the art can easily extrapolate the above given explanation of the operation of a lighting module to an application with a generalised number of bits X and Y.

Figure 3A:
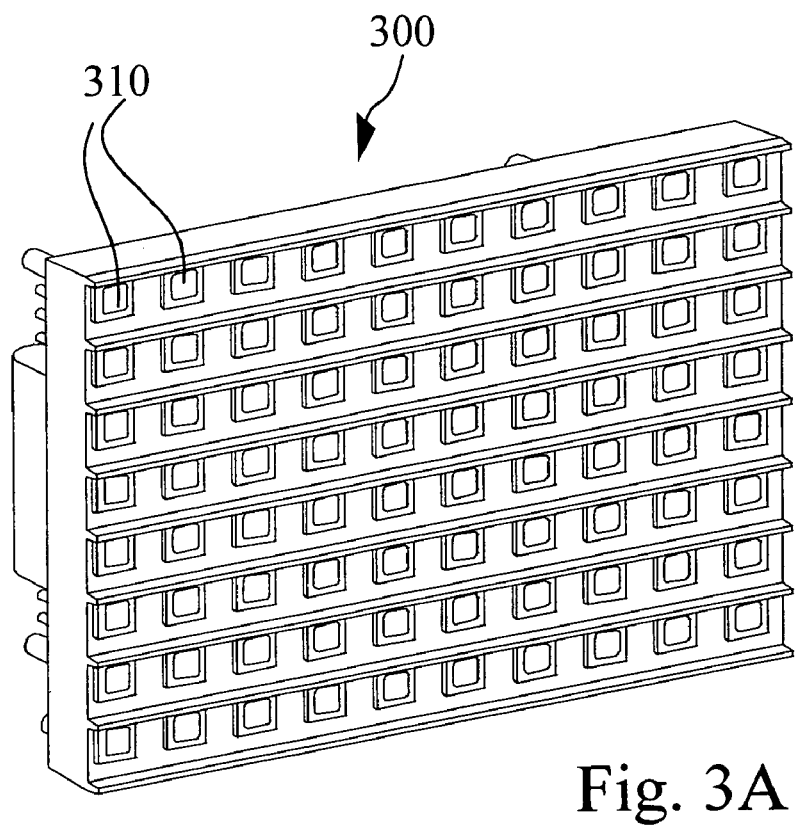
FIGS. 3A and 3B illustrate front and rear perspective views, respectively, of an intelligent lighting module assembly in accordance with the invention.
Figure 3B:
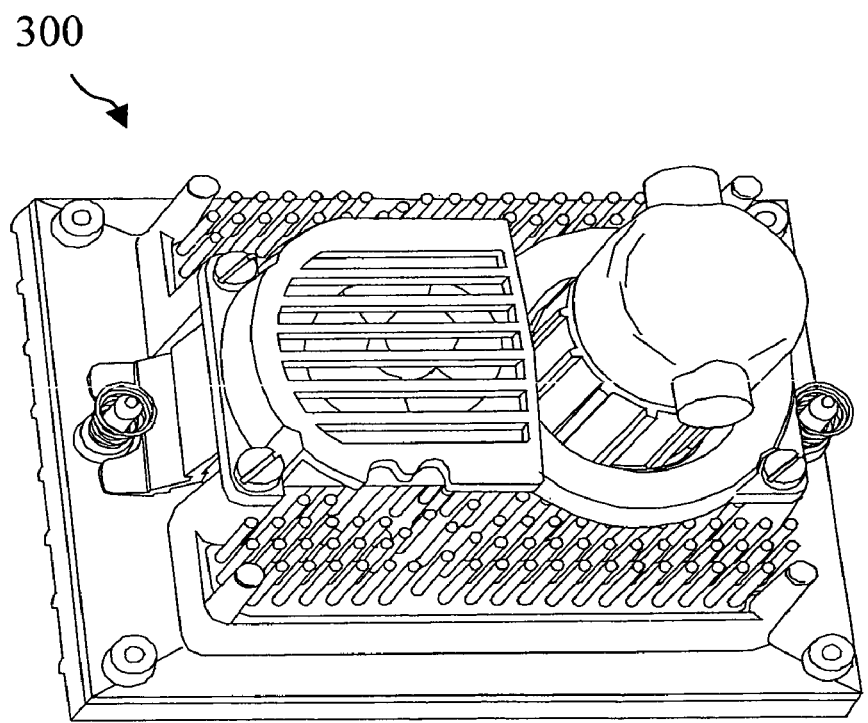

FIGS. 3A and 3B illustrate front and rear perspective views, respectively, of an intelligent lighting module assembly 300. Intelligent lighting module assembly 300 is suitable for use as an autonomous display, or, alternatively, may operate within a set of intelligent lighting module assemblies 300 to form a larger display (not shown). Intelligent lighting module assembly 300 is, for example, a 8×11 planar matrix assembly of emissive lighting elements 310. A large-scale display (not shown) is formed of a plurality of intelligent lighting module assemblies 300 to create, for example, a display that covers an entire wall.

Figure 4:
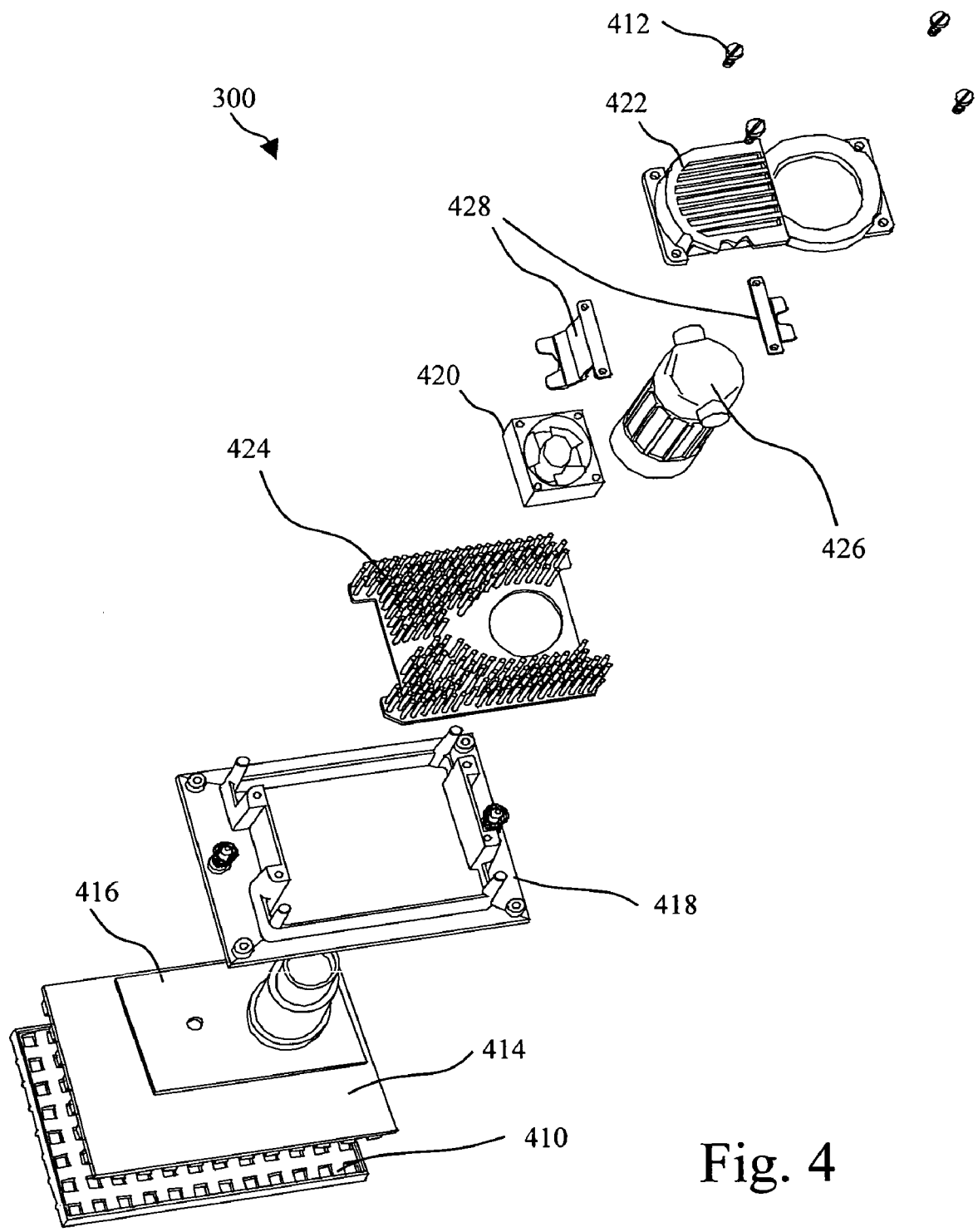
FIG. 4 illustrates an exploded rear view of an intelligent lighting module assembly in accordance with the invention.

FIG. 4 illustrates an exploded rear view of intelligent lighting module assembly 300 in accordance with the invention. Intelligent lighting module assembly 300 includes a front optics 410, a display board assembly 414 that includes a mechanical interface for attachment of front optics 410, a control board assembly 416, a chassis 418, a heat sink 424, a cooling fan 420, a fixation interface 428, a fan cover 422 and bolts 412. Cable connector 426 is part of the cable (not shown in FIG. 4) and is connected to the connector on the control board assembly 416.

Front optics 410 is a protective lens cover for intelligent lighting module assembly 300. Front optics 410 encases, for example, an 8×11 planar matrix assembly of emissive lighting elements 310; however, front optics 410 is not limited to the present example and may accommodate a variety of geometries and hold various numbers of emissive lighting elements 310 for different applications. Further, the lens design of front optics 410 determines the optical quality of emissive lighting elements 310; for example, front optics 410 that possess a small emissive cone provide a greater fill factor and result in a better quality video display. Additionally, front optics 410 may be replaced during the lifetime of intelligent lighting module assembly 300, either to maintain the display because of normal wear or damage or to upgrade intelligent lighting module assembly 300 to change the style or performance of the display. For further information regarding optical designs for intelligent lighting module assembly 300, reference is made to the description in the present provisional application entitled "System for and method of optically enhancing video and light elements." Display board assembly 414 is foreseen with a mechanical interface that includes the structural frame that affixes display board assembly 414 and chassis 418 to front optics 410. Display board assembly 414 contains emissive lighting elements 310 and electronic display drivers, as described in the discussion of display board 130 in reference to FIG. 1. Display board assembly 414 also provides a mounting structure for control board assembly 416. Control board assembly 416 contains all the intelligence required in order to operate the display from a standard data source that includes control data, i.e., DMX512, and serial display data, i.e., RGB data, as described in the discussion of control board 120 in reference to FIG. 1. Control board assembly 416 contains the power regulation capabilities to power the display. Therefore, intelligent light module assembly 300 functions as a generic building block light source that processes uniform hardware and power requirements and is capable of being formed into a seamless display. Further, intelligent lighting module assembly 300 is a lighting element that converges standard video and standard digital lighting technology in a single module. Chassis 418 is the rear enclosure of intelligent lighting module assembly 300 and the physical interface to a mounting structure (not shown). Fan cover 422 holds cooling fan 420 in place on the rear of chassis 418. Fixation interface 428 is the mechanical interface needed in order to be able to attach the fan cover to the chassis 418, by means of bolts 412. Chassis 418 can be modified to accomplish different packaging geometries; therefore, chassis 418 can be packaged for different applications or markets. Heat sink 424 is incorporated in the design for the thermal cooling of the control board assembly 416 and the display board assembly 414.

In operation, control board assembly 416 receives serial display data, display control data, and power from a source, for example, a display controller (not shown), by means of cables (not shown) that connect to cable connector 426, and processes these inputs to activate and modulate the illumination of intelligent lighting module assembly 300 that creates a display or a portion of an overall display. A large-scale display is constructed from an array of intelligent lighting module assemblies 300, for example, a large-scale wall display (not shown). For information regarding large-scale displays, see the description enclosed in the present provisional application which is entitled, "Improved display and corresponding support, emissive lighting display modules and packaging mechanical packaging and support frameworks for lighting modules for such display modules."

Figure 5:
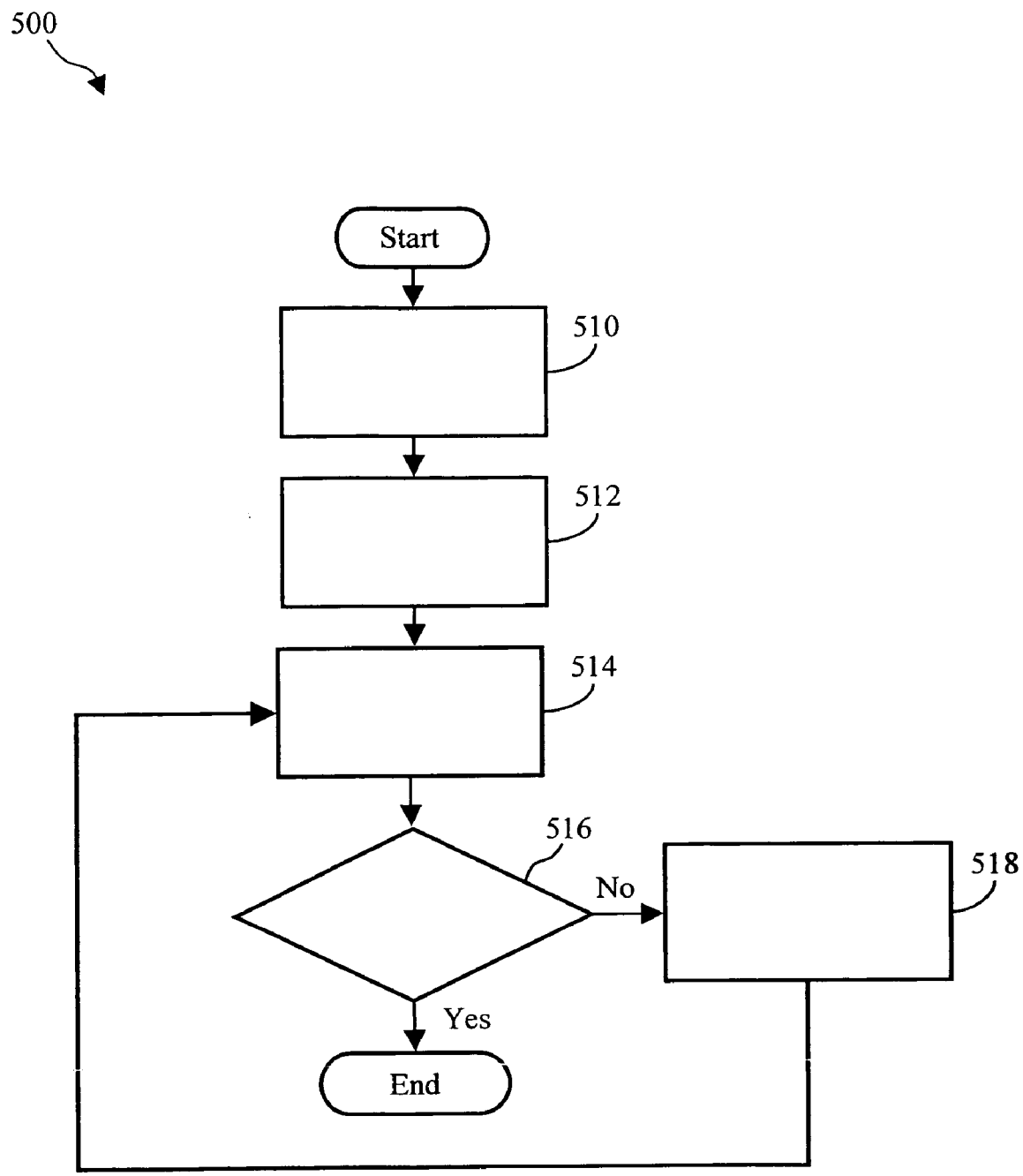
FIG. 5 is a flow diagram of an operation method of an intelligent lighting module assembly in accordance with the invention.

FIG. 5 is a flow diagram of an operation method 500 of an intelligent lighting module assembly 300 in accordance with the invention. Method 500 includes initialization and automatic configuration of control board 120. FIGS. 1 through 4 are referenced throughout the steps of method 500. Method 500 includes the following steps:

Step 510: Initializing FPGA

In this step, FPGA 126 within Control board 120 is initialized and prepared for normal operation. At power-up, FPGA 126 fetches configuration data from a configuration data sector of PROM 210 within memory 124. FPGA then automatically instantiates converter 214, control logic 216, split-PWM logic 218, CPU 224, and sensor logic 226, after which CPU 224 boots from the boot-block sector of PROM 210 and commences operation. Method 500 proceeds to step 512.

Step 512: Receiving Look-Up Tables

In this step, intelligent light module 100 receives the display configuration data that will form the contents of write look-up table 220 and read look-up table 222. The look-up tables are stored in the control board. In an alternate implementation, the default display configuration data is read from PROM 210. CPU 224 then writes the display configuration data to write look-up table 220 and read look-up table 222. Method 500 proceeds to step 514.

Step 514: Receiving Serial and Comm Data

In this step, intelligent lighting module 100 receives pixel image data and some control data on serial data 112 and display control data on communications data 114. CPU 224 modifies the pixel image data according to the installation controller in PROM 210. Using the display drive order from write look-up table 220, CPU 224 stores the modified pixel image data in RAM 212. Method 500 proceeds to step 516.

Step 516: End Display?

In this decision step, CPU 224 determines whether a command has been received via comm data 114 to cease display, for example, an off command, a reset command, or a power-down command. If yes, method 500 ends. If no, method 500 proceeds to step 518.

Step 518: Illumining Display

In this step, lighting elements 136 are illumined. CPU 224 reads the lighting data from RAM 212 by using an address modified by read look-up table 222 and writes the lighting data to split-PWM logic 218. Split-PWM logic 218 alters the data and provides 12-bit lighting data to display buffers 128. Under the control of CPU 224, this data is latched onto drive buffer 132. Pulse-width modulation drivers 134 receive the latched data from drive buffer 132 and activate the pulse-width modulation drivers 134. The activated pulse-width modulation drivers 134 thereby illumine each pixel of lighting elements 136. Method 500 returns to step 514.

The invention is in no way limited to the methods and embodiments described above and represented in the drawings, but such an intelligent lighting element and method of operation according to the invention may be realized in different shapes and dimensions, without departure from the scope of the invention.

The invention claimed is:

1. An intelligent lighting module for use in a lighting or display module system, comprising an array of lighting modules, each of said lighting modules being provided with a display board with an array of individual pixel lighting elements and with a control board capable of controlling serial input data from a video source for displaying video as well as of controlling digital communication input data from a lighting console for creating digital lighting effects, wherein the display board comprises a drive buffer and an array of pulse-width modulation (PWM) drivers which are connected to the lighting elements and wherein the control board comprises:

a serial data input;

a communication data input;

a memory containing data, executable code, and an installation controller containing installation parameters of the intelligent lighting module such as the position and orientation of the module in the lighting or display system and the module viewing angle;

a memory containing ambient environmental data and display data during run time; and a field programmable gate array (FPGA) comprising:

a converter to "de-serialize" the incoming serial data in order to produce parallel pixel data in the form of lighting data and lighting addresses;

a write look-up table and a read look-up table which provide cross-reference indexes that map the lighting data to the correct lighting element of the display board;

a display buffer; and a central processing unit (CPU) to write the lighting data to memory in the order of sequential pixel addresses by using the write look-up table and thereby translating the original lighting address order to the sequential pixel address order and, in order to illuminate the lighting elements, to read the lighting data from the random access memory by using an address modified by the read look-up table and thereby converting the stored lighting data from sequential pixel address order to display drive order, and latching said lighting data via the display buffer onto the drive buffer of the display board to activate the pulse-width modulation drivers of the display board to produce an image at the display rate.

2. The intelligent lighting module according to claim 1, wherein the lighting data are X-bit data with X bits and the pulse-width modulation drivers are Y-bit drivers requiring a data input of Y-bit data and wherein the lighting data are latched onto the drive buffer through a split-PWM logic contained in the programmable gate array (FPGA), which split-PWM logic enables the higher bit lighting data to be written to the lower bit pulse-width modulation drivers of the display board without losing the higher bit resolution of the lighting data.

3. The intelligent lighting board according to claim 2, wherein the split-PWM logic is such that it writes the Y most significant bits of the X-bit lighting data at a display write cycle rate that is equivalent to X times the display update rate, whereby a single bit is added to each of these X display write cycles, for a number of times that is equal to the value of remaining least significant bits of the X-bit lighting data and whereby the resultant Y-bit lighting data are latched onto the drive buffer of the display board which activate the lighting elements or their individual color pixels for a period of time of the total display write cycle that is proportional to the numerical value of the Y-bit lighting data.

4. The intelligent lighting module according to claim 1, wherein the field programmable gate array comprises a sensor logic which receives signals from a remote sensor on the display board to monitor the ambient light conditions for display intensity processing by the central processing unit of the field programmable gate array.

5. The intelligent lighting module according to claim 1, wherein the field programmable gate array comprises a control logic containing the necessary control functions such as timing, enabling, glue logic, sequential and combinational logic, to coordinate the operation of the field programmable gate array.

6. The intelligent lighting module according to claim 1, wherein the lighting elements are light emitting diodes (LED) or liquid crystal display pixels (LCD).

7. The intelligent lighting module according to claim 1, having a form and dimensions such that it can be used together with other similar lighting modules to build a seamless display.

8. The intelligent lighting module according to claim 1, wherein the control board is capable of controlling communication input data in the form of DMX512-protocol data or other custom lighting protocols.

9. The lighting module according to claim 1, wherein the control board comprises a power regulation.

10. A method of operation of an intelligent lighting module in accordance with claim 2, including the steps of:
   initializing the field programmable array, whereby, at power-up configuration, data are fetched from a configuration data sector in memory, and the field programmable array then automatically instantiates its converter, control logic, split-PWM logic, central processing unit and sensor logic, after which the central processing unit boots from the boot-block sector in memory containing the executable code and commences operation;
   receiving the look-up tables, wherein the intelligent light module receives the display configuration data or reads these data from memory that will form the contents of the write look-up table and read look-up table that are stored in the control board;
   receiving serial and communication data, wherein the intelligent lighting module receives pixel image data and some control data on serial data input and display control data on communication data input and the central processor unit modifies the pixel image data according to the installation controller in memory and storing the modified pixel image data in memory, using the display drive order from the write look-up table;
   deciding whether or not to end the display, whereby the central processing unit determines whether a command has been received via the communication data input to cease display and if yes ending the display, or if no, illuminating the lighting elements, whereby the central processor unit reads the lighting data from memory by using an address modified by the read look-up table and writes the lighting data to split-PWM logic that alters the data and provides Y-bit lighting data to the display buffer, and whereby this data is latched onto drive buffer which activates the pulse-width modulation drivers, thereby illuminating each pixel of lighting elements and subsequently returning to the step of receiving serial and communication data.

11. An intelligent lighting module for use in a lighting or display module system, comprising an array of lighting modules, each of said lighting modules being provided with a display board with an array of individual pixel lighting elements and with a control board capable of controlling serial input data from a video source for displaying video as well as of controlling digital communication input data from a lighting console for creating digital lighting effects, wherein the display board comprises a drive buffer and an array of pulse-width modulation (PWM) drivers which are connected to the lighting elements and wherein the control board comprises:
   a serial data input;
   a communication data input;
   a memory containing data, executable code, and an installation controller containing installation parameters of the intelligent lighting module such as the position and orientation of the module in the lighting or display system and the module viewing angle;
   a memory containing ambient environmental data and display data during run time; and
   a field programmable gate array (FPGA);
   wherein the control board is capable of controlling communication input data in the form of DMIX512-protocol data or other custom lighting protocols.

* * * * *